(12) United States Patent
Oakley et al.

(10) Patent No.: US 9,456,185 B2
(45) Date of Patent: Sep. 27, 2016

(54) HELICOPTER

(75) Inventors: John Robert Oakley, Morgan, UT (US); David Scott Heath, Conifer, CO (US)

(73) Assignee: GEOTECH ENVIRONMENTAL EQUIPMENT, INC., Denver, CO (US)

( * ) Notice: Subject to any disclaimer, the term of this patent is extended or adjusted under 35 U.S.C. 154(b) by 409 days.

(21) Appl. No.: 12/805,971

(22) Filed: Aug. 26, 2010

(65) Prior Publication Data

US 2011/0301784 A1  Dec. 8, 2011

Related U.S. Application Data

(60) Provisional application No. 61/272,170, filed on Aug. 26, 2009.

(51) Int. Cl.
| | | |
|---|---|---|
| *B64C 27/04* | (2006.01) | |
| *H04N 7/18* | (2006.01) | |
| *B64C 27/57* | (2006.01) | |
| *B64C 39/02* | (2006.01) | |
| *B64D 47/08* | (2006.01) | |
| *G05D 1/00* | (2006.01) | |
| *G05D 1/08* | (2006.01) | |

(52) U.S. Cl.
CPC .............. *H04N 7/185* (2013.01); *B64C 27/04* (2013.01); *B64C 27/57* (2013.01); *B64C 39/024* (2013.01); *B64D 47/08* (2013.01); *G05D 1/0038* (2013.01); *G05D 1/0858* (2013.01); *B64C 2201/024* (2013.01); *B64C 2201/042* (2013.01); *B64C 2201/108* (2013.01); *B64C 2201/127* (2013.01); *B64C 2201/141* (2013.01); *B64C 2201/145* (2013.01); *B64C 2201/146* (2013.01)

(58) Field of Classification Search
CPC .............................. B64C 39/024; B64C 27/04
USPC ............ 244/17.11, 17.19, 17.21, 17.25, 189, 244/190; 446/37; 701/3, 11
See application file for complete search history.

(56) References Cited

U.S. PATENT DOCUMENTS

| | | | |
|---|---|---|---|
| 3,053,480 A | | 9/1962 | Vanderlip |
| 3,174,790 A | * | 3/1965 | Bendl ........................... 294/82.3 |
| 3,749,333 A | | 7/1973 | Lykken et al. |

(Continued)

OTHER PUBLICATIONS

United States Statutory Invention Registration, Universal Automatic Landing System for Remote Piloted Vehicles, Reg. No. H628, Published: Apr. 4, 1989, Inventor: Pat McIngvale.

(Continued)

*Primary Examiner* — Christopher P Ellis
*Assistant Examiner* — Jessica Wong
(74) *Attorney, Agent, or Firm* — Jean C. Edwards, Esq.; Edwards Neils LLC

(57) ABSTRACT

The present invention relates to a reduced scale industrial helicopter, with an integrated automatic flight control system, that includes core autopilot functions, GPS management, and full-function navigation systems. The autopilot technology includes rapid launch capability, real-time in-flight switching between one or more of a) remote control, b) autopilot-directed, c) ground station controlled, and d) home modes, and is upgradeable. The helicopter is used for high or low altitude surveillance, and can handle various payloads, including photographic missions. The helicopter may include onboard batteries and/or a unique battery unit disposed beneath the helicopter, and includes autonomous features such as automatic takeoff, automatic landing, safety return to home base, and predetermined mission plans.

31 Claims, 6 Drawing Sheets

(56) References Cited

U.S. PATENT DOCUMENTS

| | | | |
|---|---|---|---|
| 4,163,535 A | 8/1979 | Austin | |
| 4,171,730 A * | 10/1979 | Dow | 180/210 |
| 4,945,367 A * | 7/1990 | Blackshear | G08B 13/19619 |
| | | | 348/143 |
| 5,015,187 A | 5/1991 | Lord | |
| 5,023,824 A * | 6/1991 | Chadima et al. | 361/679.09 |
| 5,269,654 A * | 12/1993 | Chapman | 416/120 |
| 5,377,934 A | 1/1995 | Hill | |
| 5,517,683 A * | 5/1996 | Collett et al. | 455/575.1 |
| 5,609,312 A * | 3/1997 | Arlton et al. | 244/17.11 |
| 5,971,320 A | 10/1999 | Jermyn et al. | |
| 6,286,806 B1 * | 9/2001 | Corcoran | 248/678 |
| 6,615,165 B2 | 9/2003 | Carroll | |
| 6,666,404 B1 | 12/2003 | Wingert et al. | |
| 6,810,310 B1 | 10/2004 | Mcbain | |
| 6,840,480 B2 | 1/2005 | Carroll | |
| 7,032,860 B1 * | 4/2006 | Kirk et al. | 244/17.19 |
| 7,128,705 B2 * | 10/2006 | Brendley et al. | 600/27 |
| 7,789,341 B2 | 9/2010 | Arlton et al. | |
| 8,052,081 B2 | 11/2011 | Olm et al. | |
| 8,068,949 B2 | 11/2011 | Duggan et al. | |
| 8,082,074 B2 | 12/2011 | Duggan et al. | |
| 8,292,215 B2 | 10/2012 | Olm et al. | |
| 8,322,648 B2 | 12/2012 | Kroetsch et al. | |
| 8,434,397 B1 * | 5/2013 | Deckard et al. | 89/37.16 |
| 8,515,609 B2 | 8/2013 | McAndrew et al. | |
| 8,744,647 B2 | 6/2014 | Paulsen et al. | |
| 8,761,961 B2 | 6/2014 | Lee et al. | |
| 8,774,982 B2 | 7/2014 | Oakley et al. | |
| 8,843,244 B2 | 9/2014 | Phillips et al. | |
| 8,880,241 B2 | 11/2014 | Mohamadi | |
| 8,931,730 B2 | 1/2015 | Wang et al. | |
| 8,958,928 B2 | 2/2015 | Seydoux et al. | |
| 9,061,763 B1 | 6/2015 | Christensen et al. | |
| 2002/0005456 A1 * | 1/2002 | Toulmay | B64C 27/001 |
| | | | 244/17.13 |
| 2004/0118222 A1 | 6/2004 | Cornish et al. | |
| 2005/0051667 A1 * | 3/2005 | Arlton et al. | 244/17.11 |
| 2007/0105475 A1 * | 5/2007 | Gotou et al. | 446/37 |
| 2007/0244608 A1 | 10/2007 | Rath et al. | |
| 2008/0220687 A1 * | 9/2008 | Taya | 446/37 |
| 2009/0047861 A1 * | 2/2009 | Van de Rostyne et al. | 446/37 |
| 2009/0251354 A1 | 10/2009 | Zahavi | |
| 2010/0210169 A1 * | 8/2010 | Rohr | 446/36 |
| 2010/0292873 A1 | 11/2010 | Duggan et al. | |
| 2010/0292874 A1 | 11/2010 | Duggan et al. | |
| 2012/0169484 A1 * | 7/2012 | Rohr | 340/13.25 |
| 2013/0176423 A1 | 7/2013 | Rischmuller et al. | |
| 2014/0008496 A1 | 1/2014 | Ye et al. | |
| 2014/0097947 A1 * | 4/2014 | Rohr | 340/12.5 |
| 2014/0339355 A1 | 11/2014 | Olm et al. | |

OTHER PUBLICATIONS

Non-Final Office Action issued by the US Patent and Trademark Office on Feb. 12, 2015, in connection with U.S. Appl. No. 14/301,681.

Non-Final Office Action Issued by the US Patent and Trademark Office on Dec. 18, 2012 in connection with U.S. Appl. No. 13/200,986.

Final Office Action issued by the US Patent and Trademark Office on Oct. 8, 2013 in connection with U.S. Appl. No. 13/200,986.

Notice of Allowance issued by the US Patent and Trademark Office on May 12, 2014 in connection with U.S. Appl. No. 13/200,986.

Final Office Action issued by the US Patent and Trademark Office on Nov. 17, 2015, in connection with U.S. Appl. No. 14/301,681.

Non-Final Office Action issued by the US Patent and Trademark Office on May 19, 2016, in connection with U.S. Appl. No. 14/301,681.

* cited by examiner

HELICOPTER

CROSS-REFERENCE TO RELATED APPLICATIONS

The present application claims priority from U.S. Patent Provisional Application No. 61/272,170, filed Aug. 26, 2009, the contents of which are herein incorporated by reference in their entirety.

BACKGROUND OF THE INVENTION

1. Field of the Invention

The present invention relates to a helicopter, in reduced scale form, for industrial use, that may be remotely controlled, and provides a high performance platform for high or low altitude surveillance, with varying payloads, such as camera systems for photographic missions. The helicopter of the present invention may be used for industrial use, for example in surveillance operations, such as border control, crime prevention, military reconnaissance, disaster reconnaissance, etc., and is reliable to achieve a maximum flight time with a minimum of down time. The helicopter of the present invention is a state of the art unmanned aerial vehicle (UAV)/unmanned aircraft system (UAS) helicopter with a built-in autopilot and navigation system that allows for simple flight and usage by remote, and non-remote control users.

2. Description of the Relevant Art

Although reduced scale helicopters are in existence, they suffer from reliability problems, navigation problems, and have long delays in launch time. Further, present day helicopters suffer from a lack of features that would be advantageous in industrial use (used mostly as toys), and are not upgradeable.

Thus, a reduced scale helicopter that could be used industrially, which includes state-of-the-art technology with high reliability and upgradeable features, is desired.

SUMMARY OF THE INVENTION

The present invention relates to a reduced scale industrial helicopter, with an integrated automatic flight control system, that is reliable, easy to fly, and simple to maintain. The helicopter of the present invention includes core autopilot functions, global positioning system (GPS) management, and full-function navigation systems. The autopilot technology is state-of-the-art for civilian and military usage, and includes rapid launch capability, real-time in-flight switching between one or more of a) remote control, b) autopilot-directed, c) ground station controlled, and d) home modes, and is upgradeable.

In one embodiment, the reduced scale helicopter of the present invention includes a helicopter chassis made of a material such as carbon fiber.

In one embodiment, the main rotor of the reduced scale helicopter is mounted on a vertical rotor shaft which is centered in the chassis. The main rotor is mounted on the rotor shaft, and a rotor head assembly is mounted at the top of the vertical rotor shaft, to accommodate the main rotor blades.

In an exemplary embodiment, a three-axis helicopter swash plate is disposed on the rotor shaft, below the rotor head assembly. The swash plate includes a single, stationary disk or plate, with a bearing inside which rotates with the vertical rotor shaft. The swash plate is connected to the helicopter controls by a plurality of swash plate control arms/linkages. Pushrods connect the rotor blades to the swash plate, such that the swash plate controls the pitch of the individual rotor blades.

In an exemplary embodiment, the swash plate is connected to four connectors on the chassis, that are moved by electric servomechanisms that are powered by the electrical panel, and that correspond to create: a) vertical, b) forward, c) left, and d) right, helicopter movements. The swash plate moves as each of the four connectors moves, varying the pitch angle of the helicopter blades in order to move the helicopter in the corresponding directions.

In one embodiment, the main motor may be an 8 HP (6000 W) motor, powered by a power supply (i.e., batteries). The main rotor spins the rotor blades that are connected to the top of the rotor shaft, and generates both the aerodynamic lift and force, and a clockwise rotation of the helicopter chassis, that supports the weight of the helicopter, and the thrust which counteracts the aerodynamic drag in forward flight. The force from the tail rotor counteracts this rotation by an opposite thrust.

In an exemplary embodiment, the tail rotor is driven by a separate tail motor mounted on the tail boom and includes a direct drive tail rotor shaft. The tail motor may be a brushless motor of suitable power, such as a 2 HP motor, powered by the helicopter batteries. The tail rotor shaft is suspended in the tail boom, keeping the tail shaft able to rotate freely, to spin the tail rotor. The tail rotor shaft has a beveled gear which meshes with the right angle gear to rotate the horizontal tail shaft. The tail rotor blades spin vertically. In addition, a tail pitch rod connects the tail rotor shaft and tail rotor blades. This tail pitch rod moves forward and backward and allows the tail rotor to change pitch, which creates a left or right thrust, that moves or spins the helicopter in the corresponding direction. The tail rotor creates a thrust that pushes the helicopter in a counter clockwise direction, and thus, counteracts the main rotor and creates equilibrium of the circular forces. Thus, as the rotors turn and achieve the velocity needed for the helicopter to lift off from the ground, it generates a downward force. A stabilizer is connected to the tail rotor shaft.

The power for all systems and propulsion of the reduced scale helicopter 100, is on-board batteries, which are located on a battery shelf, and which are mounted via quick release straps thereon. Each battery has a +/− connection lead that plugs into the chassis via a flush-mounted quick release connector. The batteries may be 12 volt, 5,000-10,000 discharge cycles, lithium-ion polymer (LiPo) batteries that have quick release connectors and connect into the electrical panel. The batteries connect to a main motor speed controller, which conditions the power and acts as an adjustable speed regulator for the main motor. In one embodiment, the helicopter may have additional batteries.

In another embodiment, a single slide lock battery unit may be used, that may have similar power LiPo batteries on the inside of a metal/plastic cover, and provided as a single housing with an integrated lever/handle. This battery unit includes a lever which locks and releases the battery unit from the chassis rail system that connects it to the chassis of the helicopter. The battery unit may be removed for recharging, and also allows for an automated recharge using a recharge unit that is provided on the bottom of the helicopter.

In an exemplary embodiment, there is a magnetometer disposed on a supporting holder on the tail boom, which is connected to the onboard GPS receiver, and allows for the input of directional information to the autopilot based upon magnetic compass readings. The GPS receives detailed positional information in real-time, regarding the longitude, latitude, velocity and altitude of the helicopter.

In an exemplary embodiment, an LCD screen is mounted in the primary chassis and connected via electrical wiring to the electrical panel and to the autopilot and other systems. This LCD presents the status of the helicopter, and includes several different error codes in user-based languages (including English as a primary language).

In an exemplary embodiment, a flight data card is mounted in the primary chassis, and works in conjunction with the onboard electrical system (i.e., electrical panel), LCD panel and autopilot.

In an exemplary embodiment, the primary power or electrical panel is disposed within the chassis, and accessed, for example, by a side panel of the chassis. The electrical panel includes all the associated electronics for controlling the main rotor, autopilot, tail rotor, and battery elements. This includes the respective battery terminals (6 volt) and transformers (12 volt) necessary to power and run the system. The electrical panel is also connected to the daylight-readable LCD display.

In one embodiment, the helicopter of the present invention can carry from 5 ounces up to 15 lbs of payload, such as a camera system, which can be gimbal-mounted to the front of the helicopter. The camera is controlled by a remote wireless 2.4 Ghz R/C transmitter and receiver system of a hand-held video and remote system. In additional embodiments, the payload may be an under-mount gimbal arrangement mounted to the bottom panel of the helicopter. In another embodiment, the payload or camera system is a hanging payload, and mounted hanging below the helicopter by a cable.

In an exemplary embodiment, the autopilot of the present invention is housed in the chassis and may be a commercial-off-the-shelf (COTS) autopilot, which controls all of the other vital electronic elements of the helicopter, but which may be specially programmed. The autopilot may include standard processing and memory capability, including a central processing unit (CPU), RAM, wireless communication interfaces, and/or other components. The autopilot may include, or be modified to include, software that may operate to provide various functionality. The autopilot may be implemented as an application run on existing computer operating systems.

In an exemplary embodiment, the autopilot is contained inside of the chassis on a primary autopilot shelf or harness, that is shock and vibration isolated in the X, Y, and Z axes. The autopilot 157 is connected to the shelf via vibration mounts, which are arranged to be interchangeable with different shock absorption rates to allow for low-high vibrations.

In an exemplary embodiment, the autopilot is also connected via an electrical connection to the GPS. The autopilot provides power and is connected to a wireless communication transmitter/receiver (i.e., a 900 MGhz data communications transmitter/receiver), that transmits and receives wireless instructions from a computer at the ground station. The autopilot is also connected to a remote control (RC) wireless transmitter/receiver which includes an electrical connector board (external panel). This separate connection allows the RC wireless transmitter/receiver to send separate instructions to the autopilot for helicopter vehicle control.

In one embodiment, wireless video receiving and viewing allows for an operator on the ground to view and operate the remote camera system located on the helicopter. In an exemplary embodiment, the first part of the system includes any number of cameras mounted on the helicopter, connected to a video transmitter, which may be a wireless video link such as an analog, digital or WiFi video transmission/receiver, that sends video and still photo signals wirelessly to the video and remote gimbal operation unit—whether hand-held, or at a ground station.

In an exemplary embodiment, the hand-held remote unit includes a video receiver/transmitter disposed in a primary assembly or housing; antennae for receipt of the video transmission broadcast by the helicopter, and an associated plug which connects to the LCD screen on the front side of the hand-held remote unit.

In an exemplary embodiment, there is standard operation remote control assembly with circuits and boards on the back side of the hand-held remote unit, and joy sticks disposed on the front side on either side of the LCD screen, for operation of the helicopter and the camera. In one embodiment, a portable 12 volt battery pack and integrated wiring is included in the housing.

In one embodiment, the ground station unit is similar to the hand-held unit, and includes the elements described above, with the exception of the remote control assembly with joy sticks. The ground station unit includes a rechargeable battery. In one embodiment, the ground station unit includes a portable DVR, and an additional high gain antenna/patch panel for additional gain.

In an exemplary embodiment, the ground station unit utilizes both a remote control and/or wireless-connected computer (such as a computer laptop) which operates a software program specific to the present invention. As stated above, the helicopter of the present invention has a wireless communication data link with the ability to transmit and receive flight instructions to and from the helicopter and the ground station. The ground station has the ability to send input commands to the helicopter via: a) the remote control wireless controller, or b) a computer configured with flight software connected to the wireless data link. Thus, the ground station allows the helicopter to be managed fully from the ground station software program via a wireless modem transmission/receiving signal.

In an exemplary embodiment, the autopilot of the helicopter operates in two separate modes: 1) via a wireless handheld remote control (without computer programming/software), and 2) via ground station mode (with computer programming/software). In both modes of operation, the user follows a pre-flight checklist. Once all the safety and flight operation testing and checklist is performed by the user, if all systems are ready and the helicopter can be flown, the user may begin flight operations using either the hand-held remote or the ground station unit.

In an exemplary mode, the wireless remote control unit sends wireless signals to the matching RC receiver as input to the helicopter and autopilot. The user utilizes the two joysticks on the wireless remote control as input to the onboard helicopter autopilot, and the autopilot then interprets the input commands from the joysticks to create outputs from the autopilot to the helicopter for flight: up, down, tail left, tail right, forward, backward, left sideways, right sideways. The autopilot issues the appropriate commands via an electrical output to the onboard helicopter control mechanisms that control the helicopter.

In one embodiment, in the hand-held mode, the user may utilize the wireless control system to send and receive camera and gimbal functions.

In the ground station mode, both a ground station unit, with a wireless connected computer running helicopter operational software, are used. The ground station unit includes a second wireless communication data link with the ability to transmit and receive flight instructions to and from the helicopter to the ground station. The ground station unit has the ability to send input commands to the helicopter by: a) the remote control wireless controller, or b) a computer configured with flight software connected to the wireless data link. The ground station mode allows the helicopter to be managed fully from the software program run from the computer via a wireless modem transmission/receiving signal.

In this exemplary embodiment, and similarly to the hand-held unit, the helicopter is controlled, via the autopilot, but from the ground station unit, for flight, including: up, down, tail left, tail right, forward, backward, left sideways, right sideways. The ground station unit, thus, issues the appropriate commands via the wireless modem transmission/receiving signal, to the onboard helicopter control mechanisms. Thus, the user may utilize the ground station unit to command the autopilot to control camera and gimbal functions.

In one embodiment, whether using the hand-held unit or ground station unit, the present invention includes a feature for an automated command to be sent from the autopilot to the remote control camera, for the camera to automatically take pictures in any direction. The user may command this automatic feature detailing when (time), where (GPS, altitude), and how (helicopter vehicle attitudes), the photographs would be automatically taken.

In an exemplary embodiment, the autopilot of the present invention can also trigger automatic photographs to be taken in accordance with the following functions: the number of waypoints or GPS specified points; the altitude of these waypoints; the specific latitude and longitude of the waypoints or GPS specified points; the forward velocity of the helicopter between any of these points; and the percentage overlap of the photos to be taken.

In other embodiments, the onboard the helicopter autopilot can operate with input from the ground via the hand-held or ground station modes, and includes and automatic takeoff function, an automatic landing function, an autonomous flight between waypoints function, and a safety return to home base function.

In another embodiment, the ground station computer software program allows for the creation of pre-determined missions including the capability to download satellite images of terrain with geo-referenced data and develop complete flight plans that include detailed GPS coordinates/ way points (i.e., longitude, latitude, velocity, and payload commands) management, and the ability to create height, attitude and helicopter direction, and speed of movement, between all way points. In addition, the user can switch between hand-held and ground station units during a mission.

There has thus been outlined, some features that are consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention relates to a reduced scale industrial helicopter, with an integrated automatic flight control system, that includes core autopilot functions, global positioning system (GPS) management, and full-function navigation systems. The autopilot technology is state-of-the-art for civilian and military usage, and includes rapid launch capability, real-time in-flight switching between one or more of a) remote control, b) autopilot-directed, c) ground station controlled, and d) home modes, and is upgradeable. The helicopter of the present invention provides a high performance platform for high or low altitude surveillance, and various payloads, including photographic missions. The helicopter of the present invention is a state of the art UAV/UAS helicopter that allows for simple flight and usage by remote and non-remote control users.

Apparatus

The reduced scale helicopter 100 (see FIG. 1) of the present invention typically includes a helicopter body or chassis 101 or airframe, a main rotor and a rear rotor, and landing gear. The main rotor or rotor system of the helicopter 100 is used to generate both the aerodynamic lift force that supports the weight of the helicopter 100, and the thrust which counteracts the aerodynamic drag in forward flight.

Chassis/Landing Gear

The chassis 101 or airframe of the reduced scale helicopter 100 (see FIG. 1) of the present invention, may be comprised of a strong, durable material, that is lightweight in order to reduce weight requirements for lift. In one exemplary embodiment, the chassis 101 may be made of a material such as carbon fiber, and in another embodiment, may be made of aluminum.

Figure 1:
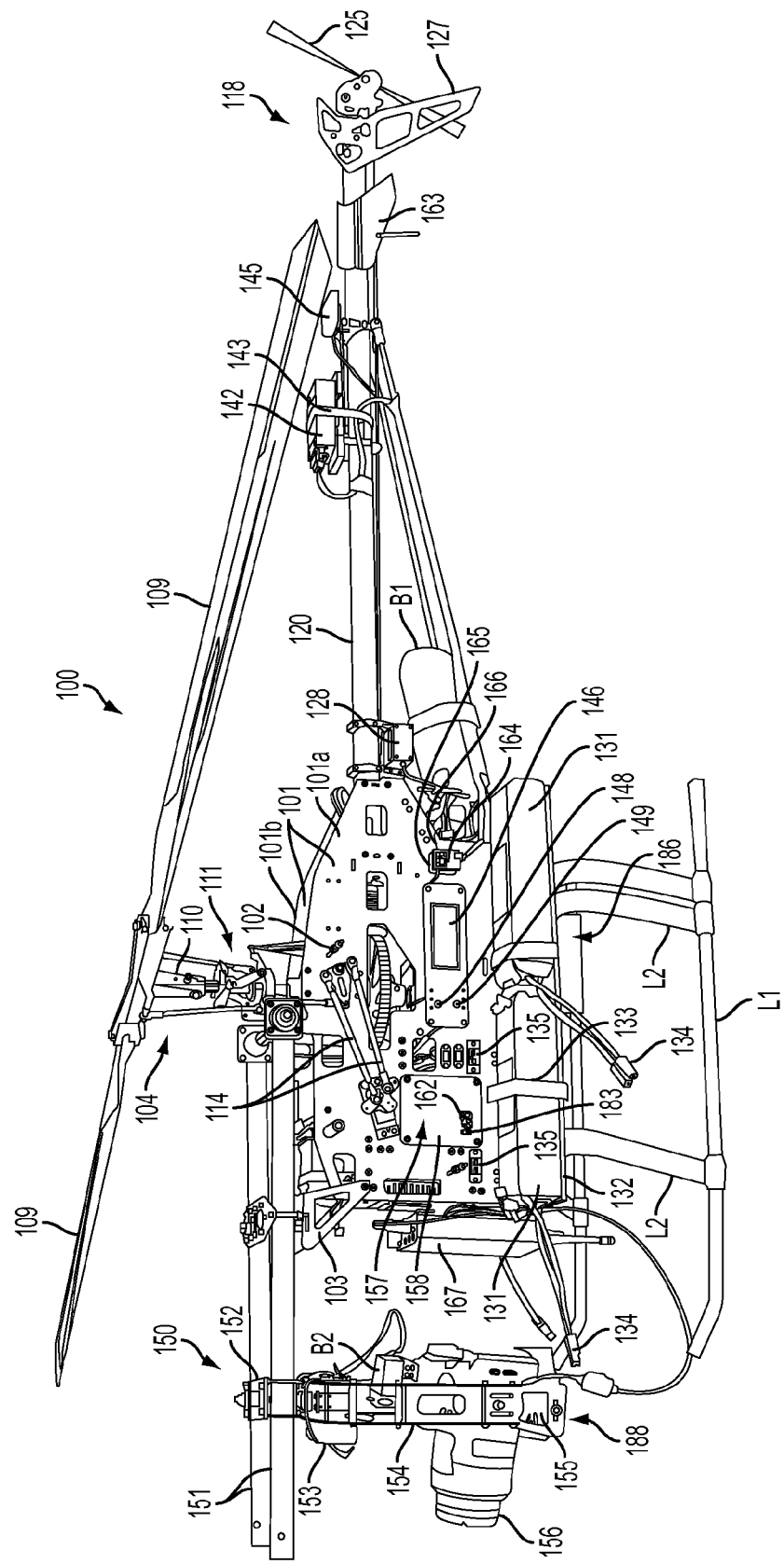
FIG. 1 is a schematic diagram of one embodiment of the helicopter of the present invention, in perspective view, with a payload mounted forward of the helicopter chassis.

As shown in FIG. 1, the chassis 101 includes two hinged side panels—the left side panel 101a and the right side panel 101b, and a bottom panel 101c. Each side panel 101a, 101b includes attachment mechanisms 102, such as screw mounts and L brackets (not shown), at various positions on the internal equipment, to stabilize and secure all equipment between the two panels 101a, 101b, as well as to secure all equipment disposed outside (externally) of the chassis 101.

In one embodiment, a brace 103 or attach mount 103 keeps the chassis 101 stabilized by attaching to horizontal bars 151 of a payload (i.e., camera mount 150) (see FIG. 1).

Note that the size of the chassis 101 depends on the scale of the helicopter 100 desired, as long as the helicopter 100 meets the operable requirements of the present invention, as described herein.

All equipment or elements of the helicopter 100 are electrically grounded and attached to the (carbon fiber) chassis 101, including all internal and external components, and includes electromagnetic interference (EMI) shielding.

The landing gear of the reduced scale helicopter 100 may include two parallel tubular elements L1 that are connected to the main bottom panel 101c of the chassis 101, via 4-6 elements L2. These elements L2, which may be hollow tubes for weight requirements, for example, may also be made longer or shorter to create more space from the ground to the main chassis 101 when the helicopter 100 is sitting on any surface.

In an exemplary embodiment, the height of the reduced scale helicopter 100 is 19¾ inches, with a standard length of 58 inches, and a high lift length of 63¾ inches. In an exemplary embodiment, a standard weight is 21 pounds, with a high lift weight of 23 pounds. However, one of ordinary skill in the art would recognize the appropriate size and weight for the lift requirements of the helicopter 100.

Main Rotor

In one embodiment, the main rotor 104 of the reduced scale helicopter 100 is mounted on a vertical rotor shaft 105 (see FIG. 2) which is centered in the chassis 101. The main rotor 104 is mounted on the rotor shaft 105 using bearings 106, 107 which allow the vertical shaft 104 to spin freely. The bearings 106, 107 may be made of a durable material such as ceramic. In one exemplary embodiment, the main rotor 104 may have a standard diameter of approximately 1842 mm, with a high lift diameter of 2082 mm; however, one of ordinary skill in the art would know the appropriate diameter of the main rotor 104 to achieve the desired features of the helicopter 100.

In an exemplary embodiment, a rotor head assembly 108 is mounted at the top of the vertical rotor shaft 105, to accommodate the main rotor blades 109. The main rotor blades 109 may number 2-5 blades, and are made of an appropriate durable material such as carbon fiber, which allows for easy lift of the helicopter 100. The rotor head assembly 108 is secured to the rotor shaft 105 by appropriate attachment mechanisms such as linkages 110.

In an exemplary embodiment, a three-axis helicopter swash plate 111 is disposed on the rotor shaft 105 above the ceramic bearings 106, 107 and below the rotor head assembly 108. The swash plate 111 includes a single, stationary disk or plate, with a bearing inside (not shown) which rotates with the vertical rotor shaft 105. The swash plate 111 is connected to the helicopter 100 controls by a plurality of swash plate control arms/linkages 112, made of a durable material such as titanium. Pushrods 113, made of a durable material such as titanium, connect the rotor blades 109 to the swash plate 111, such that the swash plate 111 controls the pitch of the individual rotor blades 109.

In an exemplary embodiment, the swash plate 111 is connected to four connectors 114 (see FIG. 1) (two on each side panel 101a, 10b) of the chassis 101, that are moved by electric servomechanisms that are powered by the electrical panel 115, and that correspond to create: a) vertical, b) forward, c) left, and d) right, helicopter movements. The connectors 114 may be made of a durable, lightweight material such as titanium. The swash plate 111 moves as each of the four connectors 114 moves, varying the pitch angle of the helicopter blades 109 in order to move the helicopter 100 in the corresponding directions.

In an exemplary embodiment, a gear 116 is disposed at the bottom of the vertical rotor shaft 105, and is connected to the gears (not shown) in the main motor 117. The main motor 117 may be of suitable power, such as an 8 HP (6000 W) motor, powered by the power supply (i.e., batteries 131) to the helicopter 100 (discussed further below). The gear 116 may be made of a durable material such as nylon-polymer. The gears of the main motor 117 and the gear 116 are intermeshed so that when the main motor 117 spins, the gear 116 engages and spins the main rotor 104. The main rotor 104 spins the rotor blades 109 that are connected to the top of the rotor shaft 105, and this generates both the aerodynamic lift and force, and a clockwise rotation of the helicopter chassis 101, that supports the weight of the helicopter 100, and the thrust which counteracts the aerodynamic drag in forward flight. The force from the tail rotor 103 counteracts this clockwise rotation by an opposite thrust.

Tail Rotor

Figure 2:
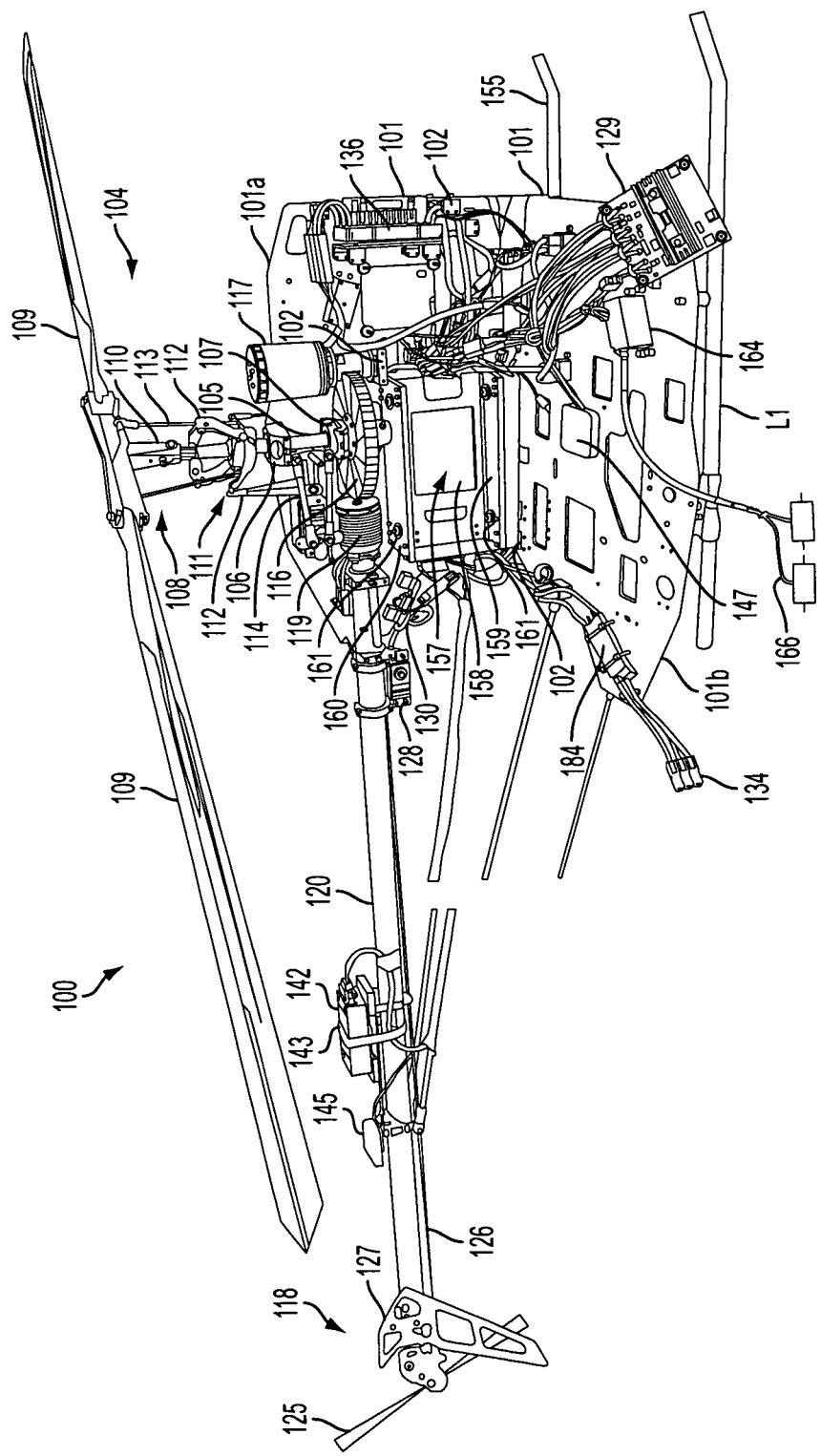
FIG. 2 is a schematic diagram of one embodiment of the helicopter of the present invention, in perspective view, with one side panel of the helicopter chassis opened, to show the internal components of the helicopter.
Figure 3:
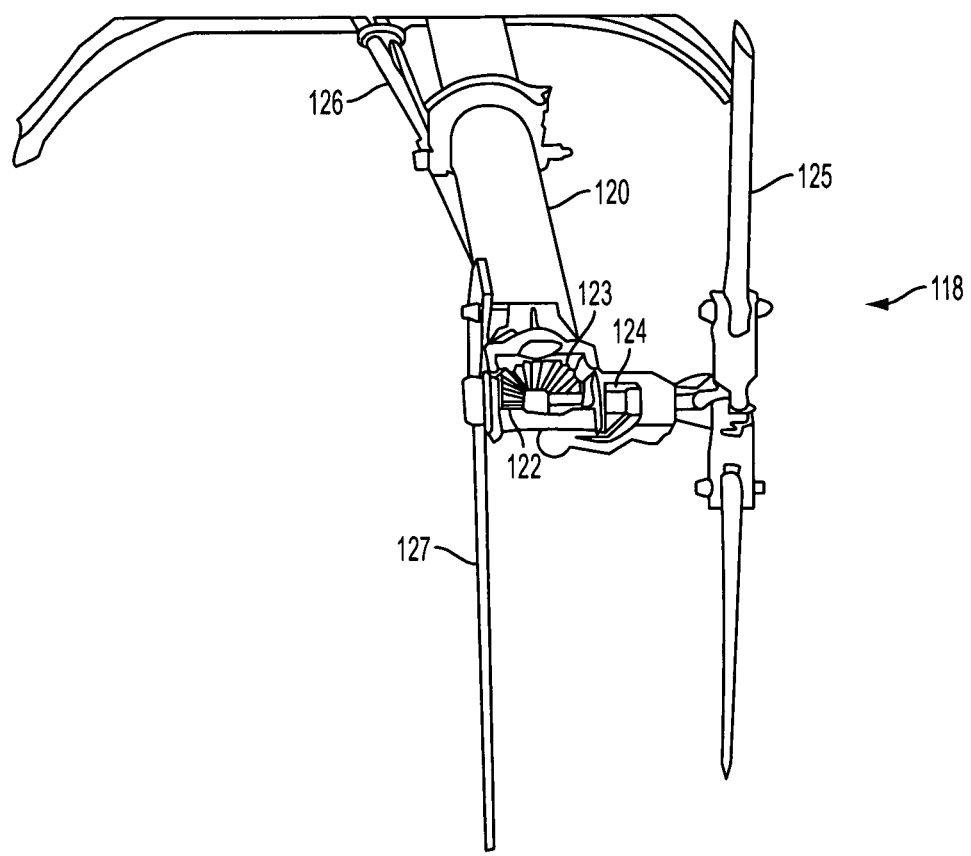
FIG. 3 is a schematic diagram of one embodiment of the tail rotor of the helicopter of the present invention.

In an exemplary embodiment, the tail rotor 118 (see FIG. 2) is driven by a separate tail motor 119 mounted on the tail boom 120 and includes a direct drive tail rotor shaft 121 (see FIG. 3). The tail motor 119 may be a brushless motor of suitable power, such as a 2 HP motor, powered by the helicopter batteries 131 (see below). The tail boom 120 may be comprised of a hollow lightweight and sturdy tube, made from, for example, carbon fiber or aluminum, that has an attached right angle gear 122. The tail rotor shaft 121 is suspended in the tail boom 120 by two bearings (such as ceramic bearings) at each end (not shown), keeping the tail shaft 121 able to rotate freely in all weather conditions, to spin the tail rotor 118. In one exemplary embodiment, the tail rotor 118 may have a standard diameter of approximately 285 mm, with a high lift diameter of 310 mm; however, one of ordinary skill in the art would know the appropriate diameter of the tail rotor 118 to achieve the desired features of the helicopter 100.

In one embodiment, the complete tail boom 120 can be removed and located in any position to accommodate scale or enclosed fuselages. In another "heavy hauler" embodiment, the tail motor 119 may be mounted directly to the tail and becomes the tail rotor shaft 121. This lightens the entire tail apparatus 118 and simplifies the drive system of the helicopter 100.

The tail rotor shaft 121 has a beveled gear 123 (see FIG. 3) which meshes with the right angle gear 122 to rotate the horizontal tail shaft 124. The horizontal tail shaft 124 has a relatively smaller set (for example, at least two) of tail rotor blades 125 mounted to the horizontal tail shaft 124. The tail rotor blades 125 spin vertically. In addition, a tail pitch rod 126 connects the tail rotor shaft 121 and tail rotor blades 125. This tail pitch rod 126 moves forward and backward and allows the tail rotor 118 to change pitch, which creates a left or right thrust, that moves or spins the helicopter 100 in the corresponding direction. The tail rotor 118 creates a thrust that pushes the helicopter 100 in a counter clockwise direction, and thus, counteracts the clockwise rotation of the main rotor 104 and creates equilibrium of the circular forces. Thus, as the rotors 104, 118 turn and achieve the velocity needed for the helicopter 100 to lift off from the ground, it generates a downward force. A stabilizer 127 is connected to the tail rotor shaft 121.

In one embodiment, the tail speed controller 128 (see FIG. 2) connects to the tail pitch rod 126, and to the electrical panel 129. The tail speed controller 128 conditions the power and acts as an adjustable speed regulator for the tail motor 119. The tail gyrometer 130 connects to the tail speed controller 128 and is an electrical device that manages the left and right movement of the tail rotor 118, to manage the counter thrust of the main rotor 104. The tail gyrometer 130 is controlled using a programming interface 184 having quick release connector leads 134, the tail gyrometer 130 which connects to the tail motor 119 that is mounted to the main chassis 101 and extends toward the back of the chassis 101.

Power Supply

The power for all systems and propulsion of the reduced scale helicopter 100, is electric. On-board batteries 131 supply all power to the helicopter 100 for a flight time ranging from 20 minutes to one hour. However, one of ordinary skill in the art would know that the capacity of the batteries 131 would affect the flight time accordingly.

In an exemplary embodiment, the batteries 131 (see FIG. 1) are located on a battery shelf 132 (see FIG. 1), made of carbon fiber, for example, and disposed on both sides (left and right) of the chassis 101, and which are mounted via quick release straps 133 thereon. Each battery 131 has a +/− connection lead 134 that plugs into the chassis 101 via a flush-mounted quick release connector 135. For example, there are a total of four (4) main 12 volt, 5,000-10,000 discharge cycles, lithium-ion polymer (LiPo) batteries 122 (two on each side of the chassis 101) that have quick release connectors 135 and connect into the electrical panel 129, for use by the main rotor 104, main motor 117, tail rotor 118, and tail motor 119. In one embodiment, the batteries 131 connect to a main motor speed controller 136, which conditions the power and acts as an adjustable speed regulator for the main motor 117. However, one of ordinary skill in the art would know how to calculate the number of batteries required to meet the power requirements of the reduced scale helicopter 100.

In one embodiment, the helicopter 100 may have additional batteries, by making the battery shelf 132 wider to accommodate additional batteries, as well as by adding additional batteries (i.e., a fifth battery B1, for example), to the chassis 101 at either the right panel side 101b (the side opposite to the LCD 146), or to the tail end of the helicopter 100 (see FIG. 1) (where it may also be used for ballast). In another embodiment, additional batteries may be connected to the electrical panel 129 and used for the tail motor/tail rotor 119/118.

In yet another embodiment, there may be a plurality (i.e., two) relatively smaller 12 volt, 1,300 discharge cycle, batteries (not shown), that are connected to the electrical panel 115 separately, that may be used as a redundant power source for the autopilot system 157 (discussed below).

A recharge unit 186 is supported in full connection on the bottom of the battery shelf 132. The recharge unit 186 allows for a positive and negative receiving unit, so that an external connection device (not shown) can be connected to the helicopter 100 for automated charging. This allows for the entire battery system 131 to be charged without removing the batteries 131 from the helicopter 100.

Figure 4:
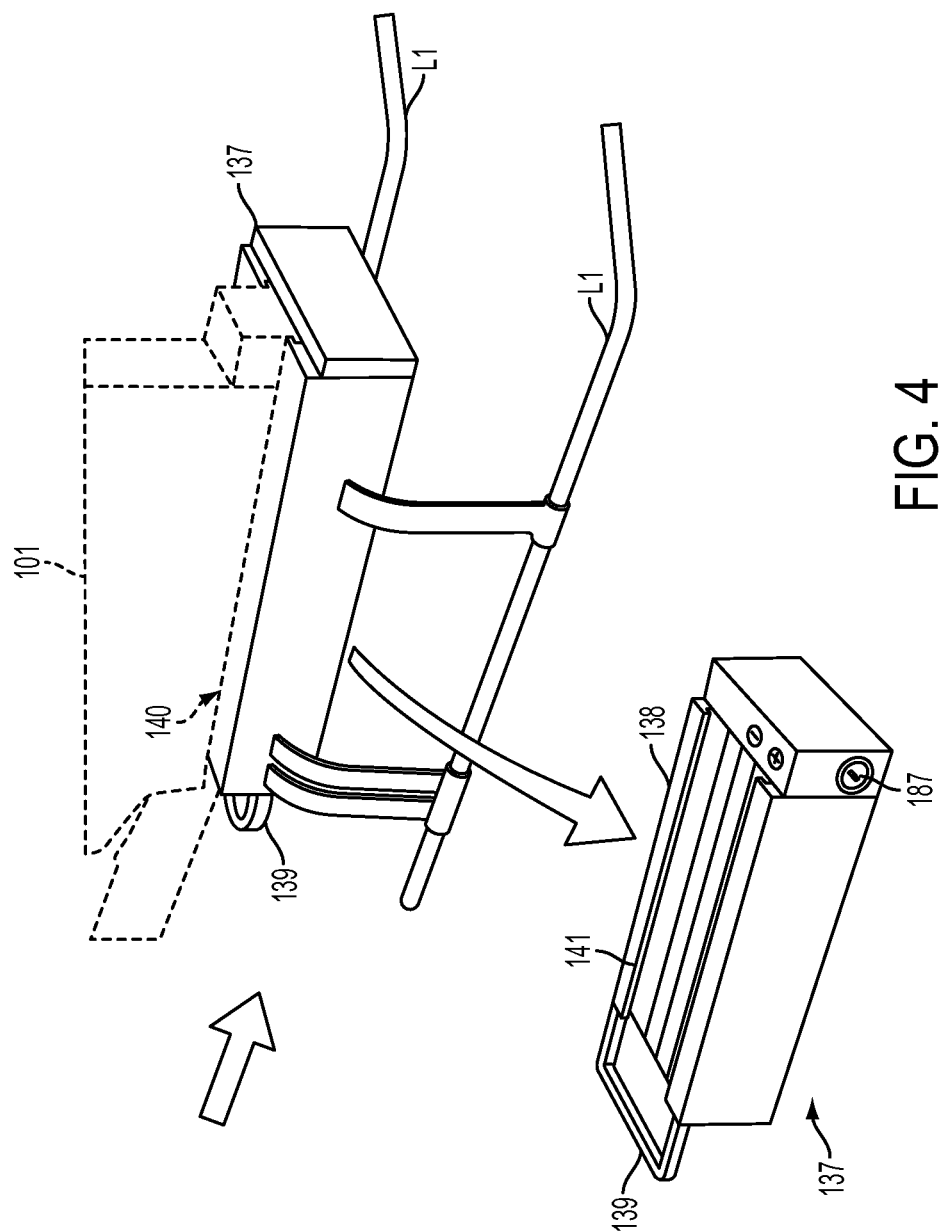
FIG. 4 is a schematic diagram of one embodiment of a battery pack disposed on the underside of the chassis of the helicopter of the present invention.

In another embodiment, a single slide lock battery unit 137 may be used (see FIG. 4). This battery unit may have similar power LiPo batteries on the inside of a metal/plastic cover 138, and provided as a single housing with an integrated lever/handle 139. This battery unit 137 is supported by a "rail" or grooved system 140 on the bottom of the helicopter chassis 101, and a matching rail/grooved system 141 is provided on the top of the battery unit 137. The single battery unit 137 is placed into the chassis rail system 140, and slid into place along the rail or grooves 140, until the battery unit 137 "connects" with the terminals of the chassis rail system 140, at which time the user may use the lever or handle 139 to lock the battery unit 137 in place. Once the lever 139 is set to the "lock" position, the battery unit 137 has a locking mechanism 187 (i.e., keyed lock) that will keep the battery unit 137 locked to the primary chassis 101. This allows the helicopter 100 to now receive power. The user may pull the lever 139 and release the battery unit 137 from the chassis rail system 140, once the battery unit 137 is unlocked. Once the battery unit 137 is released, it may be slid out from the primary chassis 101 and replaced with another battery unit. This allows the battery unit 137 to be recharged. The single battery unit 137 also allows for an automated recharge using the recharge unit 186 that is provided on the bottom of the helicopter 100, as described above.

In one embodiment, the batteries 131 may be used in harsh weather, such as under temperatures from −20 to 120 Fahrenheit, and at high altitude situations above 10,000 feet, without loss of thrust and freezing or overheating.

Magnetometer and Global Positioning System (GPS)

In an exemplary embodiment, there is a magnetometer 142 disposed on a supporting holder 143 on the tail boom 120, which is held by Velcro straps 144. The magnetometer 142 is connected to the onboard GPS receiver 145, for example, and allows for the input of directional information to the autopilot 157 (discussed below) based upon magnetic compass readings.

In one embodiment, the GPS 145 receives detailed positional information in real-time, regarding the longitude, latitude, velocity and altitude of the helicopter 100. The GPS 145 is connected to, and sends real-time data to the onboard autopilot 157 (described below), as well. The GPS 138 can be a standard GPS card with antennae to receive positional information, and which works with all the major navigational systems in use.

Liquid Crystal Display (LCD) Screen

In an exemplary embodiment, also mounted in the primary chassis 101 is a daylight-readable LCD screen 146 that is connected via electrical wiring to the electrical panel 129 and to the autopilot 157 (described below) and other systems. This LCD 146 displays the status of the helicopter 100, and includes several different error codes in user-based languages (including English as a primary language). The LCD 146 status display includes, among others, for example: a) status of the autopilot 157, b) satellite reception and grade of satellite reception from the GPS 145, c) indication of power percentage used by the batteries 131 and the power available for both the main systems and autopilot 157, d) helicopter 100 overall system health (described below) and ability to fly, e) the revolutions per minute (RPM) of the vehicle main rotor 104, and f) stability mode of the helicopter 100 (i.e., whether fully stabilized, partially stabilized, or in a remote control (RC) mode).

Flight Data Card

In an exemplary embodiment, a flight data card 147 is mounted in the primary chassis 101, and is commonly known as a black box recorder. The data card 147 works in conjunction with the onboard electrical system (i.e., electrical panel 129), LCD panel 146 and autopilot 157. The data card 147 is used to save the autopilot 157 data collected from each flight, in one embodiment, for up to approximately 100 flights. The autopilot system 157 posts full data from all in-flight sensors and data channels to the data recorder/memory that in turn creates files onto a removable memory card 147. These data channels include all avionics (i.e., X, Y, Z motion, command inputs, helicopter vehicle 100 outputs, GPS 145 data, helicopter vehicle 100 parameters, and ground station unit 169 input), and custom sensors, mounted on the helicopter 100 platform. The data card 147 is removable and allows for a read and write capability.

Electrical Panel

In an exemplary embodiment, the primary power or electrical panel 129 is disposed within the chassis 101, and accessed, for example, by a side panel (i.e., right side panel 101b) of the chassis 101 (see FIG. 2). The electrical panel 129 includes all the associated electronics for controlling the main rotor 104, autopilot, tail rotor 118, and battery elements 131. This includes the respective battery terminals (6 volt) and transformers (12 volt) necessary to power and run the system 129. The electrical panel 129 is also connected to the daylight-readable LCD display 146 that has readable messages.

In one embodiment, the electrical panel 129 is also connected to two (2) light-emitting diodes (LEDs) 148 (BLUE), and 149 (RED), which are disposed next to the LCD 146 display (see FIG. 1). In one embodiment, the LEDs 148, 149 indicate to the user whether an error has been encountered, or if it is safe to fly. If, for example, the LED indicator 149 is RED, this is an indication that an error has been encountered and the error will show a message on the LCD screen 146. The LED 149 may also blink red to indicate to the user that an error has occurred. An example would be if the helicopter 100 was in flight, and the battery voltage dropped below a minimum specified voltage, then the RED LED 149 would start blinking to indicate to the user that there is low battery power.

The second state of the helicopter 100 is shown by LED 148, which is BLUE, and when this is lighted, or blinking, then this indicates to the user that all systems are "OK", and the helicopter 100 is safe to fly.

Camera Mount a) Front Mounted Gimbal

In one embodiment, the helicopter 100 of the present invention can carry from 5 ounces up to 15 lbs of payload.

Figure 5:
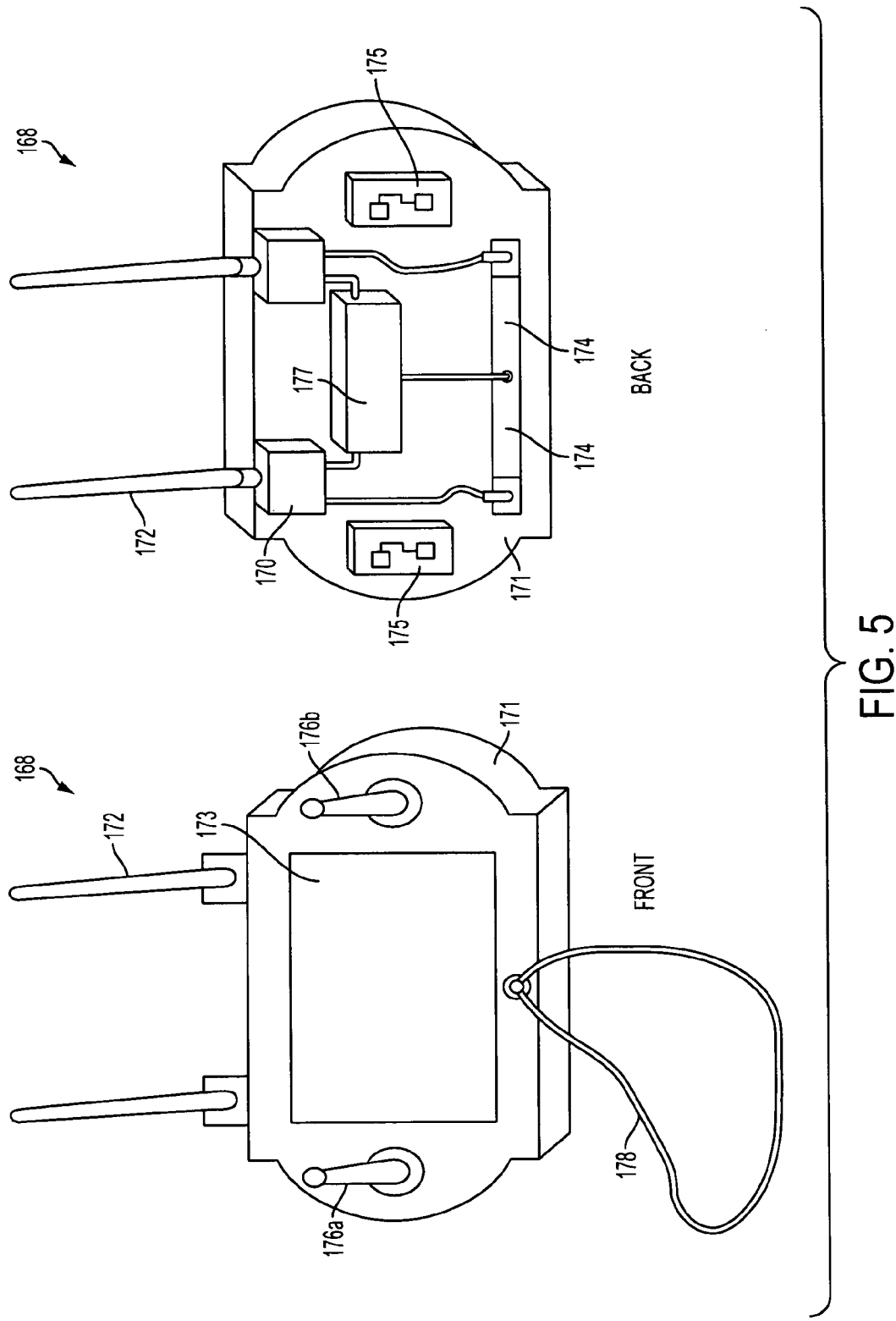
FIG. 5 is a schematic diagram of one embodiment of the hand-held remote control unit which controls the helicopter of the present invention.

In a first exemplary embodiment, and as shown in FIG. 1, the payload with camera system 150 is gimbal-mounted to the front of the helicopter 100 of the present invention, and has the ability to allow for a remote wireless 2.4 Ghz RC transmitter and receiver system, for example, of a hand-held video and remote system 168 (see FIG. 5), to remotely control a 360 degree left- and right-turning movement, with a 0-90 degree pan and tilt mechanism. This allows a user to move the camera 156 while the helicopter 100 is in operation at, for example, an altitude up to 12,000 ft, and a distance of up to 5 miles from the hand-held video and remote unit 168.

In one embodiment, the camera mount 150 (see FIG. 1) includes two horizontal elements 151, that connect, respectively, to the top of the left panel 101a and right panel 101b of the chassis 101, and which extend forward of the helicopter 100. The horizontal elements 151 are connected via a plate 152, which may be made of a durable material such as carbon fiber, and which is disposed at the top of the camera mount 150. Mounted to this plate 152 is a single vertical screw that has a gear system 153 and which is connected to a servomechanism, to allow movement in 0-360 degree panning.

In one embodiment, two parallel plates 154 made of a durable, lightweight material such as carbon fiber, extend vertically downwards from the horizontal elements 151, and are connected to a single plate 188 at the bottom, which is disposed between the parallel plates 154. The single plate 188 is connected to the parallel vertical plates 154 by a gear system 155 that is connected to a servomechanism, which is gimbal-mounted to allow for 0-180 degree tilting. This single plate 188 creates a shelf for any type of camera system 156, such a high-definition (HD) camera, single lens reflex (SLR) camera, HD video, thermal imaging, night vision and infrared camera, or color block camera (e.g., FLIR Infrared Camera/Model Photon 320, or Sony FCB-EX/Color Block Camera). In one embodiment, the camera 156 used may be military-qualified with thermal imaging, usable in a wide range of temperatures, with 8- or 14-bit digital video formats, digital zoom, image polarity, image colorization, video motion detection, picture freeze, etc. An additional battery B2 may be used to power the camera system 156.

Alternative Payload Mounts

In additional embodiments, there may be alternative payload arrangements used with the helicopter 100 of the present invention. In one alternative embodiment, the helicopter 100 of the present invention includes an under-mount gimbal arrangement mounted to the bottom panel 101c of the helicopter 100. In another alternative embodiment, the payload or camera system 156 is a hanging payload, and mounted hanging below the helicopter 100 by a cable.

Autopilot

In an exemplary embodiment, the autopilot 157 of the present invention is housed in the chassis 101 and may be a commercial-off-the-shelf (COTS) autopilot, which controls all of the other vital electronic elements of the helicopter 100, but which may be specially programmed. The autopilot 157 may include standard processing and memory capability, including a central processing unit (CPU), RAM, wireless communication interfaces, and/or other components. The autopilot 157 may include, or be modified to include, software that may operate to provide various functionality, such as data gathering. The autopilot 157 may be implemented as an application run on existing computer operating systems. The autopilot 157 application may be ported to other personal computer (PC) software (discussed further below), and/or any other digital device with appropriate storage capability.

The processor of the autopilot 157 may access a memory in which may be stored at least one sequence of code instructions that may include the software program for performing predetermined operations. While the system of the present invention may be described as performing certain functions, one of ordinary skill in the art will readily understand that the software program may perform the function rather than the entity of the system itself. The memory may be a storage device that stores at least one data file, such as image files, text files, data files, audio files, video files, among other file types.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using a software program. Further, although specific components of the system have been described, one skilled in the art will appreciate that the system suitable for use with the methods and systems of the present invention may contain additional or different components.

In an exemplary embodiment, the autopilot 157 of the present invention is contained inside of the chassis 101 on a primary autopilot shelf or harness, that is shock and vibration isolated in the X, Y, and Z axes. Specifically, the autopilot 157 is connected vertically to a board 158, and the board 158 is mounted to two horizontal boards 159, 160 (made of carbon fiber, for example), which are located at the bottom 159 and top 160 (see FIG. 2) of the board 158. The autopilot 157 is connected to these horizontal boards 159, 160, via vibration mounts 161. The mounts 161 are arranged to be interchangeable with different shock absorption rates to allow for low-high vibrations. In one embodiment, there are two mounts 161 located at each of the top 160 and each of the bottom 161 boards. The boards 159, 160 are connected to the chassis 101 by attachment mechanisms 102. Also, other elements in the helicopter 100 are arranged and mounted for shock and vibration isolation, via silicone bushings (not shown) in the chassis 101.

In an exemplary embodiment, the autopilot system 157 is connected to the electrical panel 129, and is also connected to the four connectors and servomechanisms 114 that connect to the swash plate 111. There are five primary sensors (not shown), including inertial measurement units (IMUs) (for X,Y,Z operation), within the autopilot 157, which indicate position and attitude of the helicopter 100 and feed into the primary electrical panel 129. The autopilot 157 is also connected to a servomechanism (not shown) that connects to the tail pitch rod 126 (see above). These connections allow the autopilot 157 to direct the helicopter 100 in three axes (i.e., X, Y or Z) while in the air. LEDs 162 (see FIG. 1) show the status of the autopilot 157 and battery 131 operation.

Figure 6:
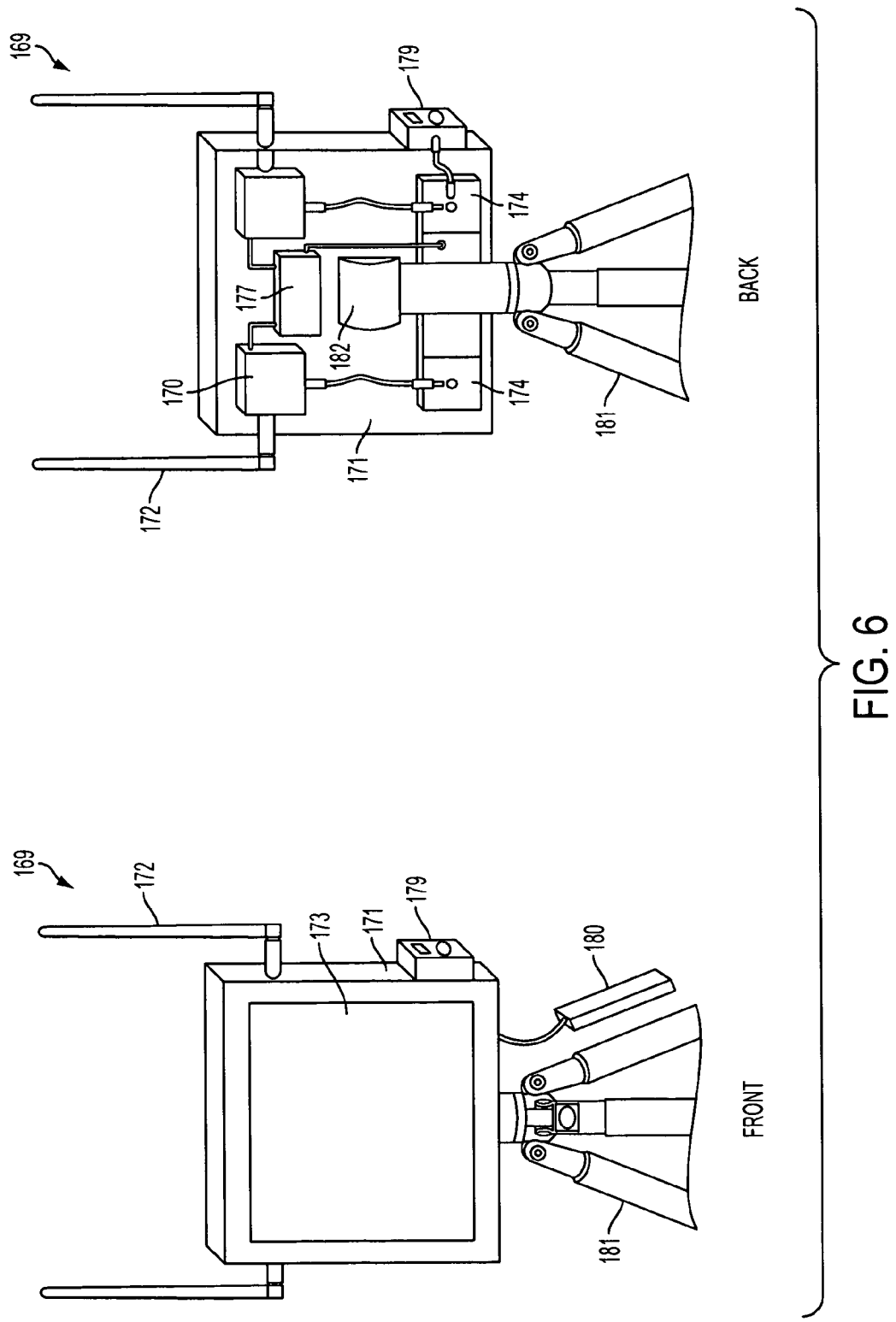
FIG. 6 is a schematic diagram of one embodiment of the ground station unit which controls the helicopter of the present invention.

In an exemplary embodiment, the autopilot 157 is also connected via an electrical connection to the GPS 145. The autopilot 157 is connected to the GPS 145 antennae that receive satellite information that the autopilot 157 uses to identify a location in latitude, longitude, altitude, and velocity. The autopilot 157 provides power and is connected to a wireless communication transmitter/receiver 163 (for example, a 900 MGhz data communications transmitter/receiver) (see FIG. 1), that transmits and receives wireless instructions from a computer (not shown) at a ground station unit 169 (see FIG. 6). The autopilot 157 is also connected to an RC wireless transmitter/receiver 164 which includes an electrical connector board (external panel) 165. This separate connection allows the RC wireless transmitter/receiver 164 to send separate instructions to the autopilot 157 for helicopter 100 vehicle control. The RC wireless transmitter/receiver 164 has a plurality of (i.e., four) separate wireless antennae 166 that are connected to and receive power from the electrical connector board 165 that is mounted on the left panel 101a of the chassis 101.

Wireless Video Transmission and Receiving Units

In one embodiment, wireless video receiving and viewing allows for an operator on the ground to view and operate the remote camera system 156 located on the helicopter 100. In an exemplary embodiment, the first part of the system includes any number of cameras 156 mounted on the helicopter 100, connected to a video transmitter 167, which may be a wireless video link such as an analog, digital or WiFi video transmission/receiver 167 (see FIG. 1) (for example, a 900-5 GHz transmission analog, or Digital or Wifi device), that sends video and still photo signals wirelessly to the video and remote gimbal operation unit—whether hand-held 168, or at a ground station 169.

a) Hand-Held Remote Control Unit

In an exemplary embodiment, the hand-held remote control unit 168 (see FIG. 5), includes, for example, a video receiver/transmitter 170 (for example, a 900-5 GHz transmission in analog, digital, or WiFi), disposed in a primary assembly or housing, such as a metal (i.e., aluminum powder-coated) frame 171. The hand-held remote control unit 168 includes antennae 172 for receipt of the video transmission broadcast by the helicopter 100, and an associated plug which connects to the LCD screen 173 on the front side of the hand-held remote control unit 168. In one embodiment, the LCD screen 173 is a flat panel LCD, such as a daylight "High Bright" 10.4 inch or 8.6 inch screen, for example, that offers the ability to range in brightness from approximately 1,000 NIT's of brightness to ½ NIT. In one embodiment, the unit 168 may also include dual RCA inputs and picture-in-picture video for screen systems 174.

In an exemplary embodiment, there is a standard operation remote control assembly with circuits and boards 175 on the back side of the hand-held remote control unit 168, which would be familiar to one of ordinary skill in the art. The remote control assembly 175 includes joy sticks 176a, 176b (for example, 2.4 GHz control sticks with programmable settings and sensitivities) disposed on the front side of the hand-held remote control unit 168, on either side of the LCD screen 173, for operation of the helicopter 100 and the payload, such as a camera 156. In one embodiment, the operation of the camera 156 includes three (3) degrees of motion for the camera 156, including pan and tilt, up and down, and spinning 360 degrees in a circle. In one embodiment, there is a second data channel for the operation of the camera 156 including zoom, shutter, focus and other applicable camera functions, or for other payload functions.

In one embodiment; a portable 12 volt battery pack 177 and integrated wiring is included in the housing 171 (see the back side of the hand-held remote unit 168). In one embodiment, the complete frame and equipment of the hand-held remote control unit 168 weighs approximately 5 lbs or less. In one embodiment, there is also an associated optional shoulder strap and harness 178 to fit around the user's neck for ease in holding the hand-held remote control unit 168.

b) Ground Station Unit

The ground station unit 169 (see FIG. 6) is similar to the hand-held remote control unit 168, and includes the elements described above with the exception of the remote control assembly 175 with joy sticks 176a, 176b, and the harness 178. The ground station unit 169 includes a rechargeable battery 177. In one embodiment, the LCD screen 173 may be larger, such as a 15" 1,000 NIT daylight viewable screen, connected to an active video, for example. As with the hand-held remote control unit 168, the LCD screen 173 offers a picture-in-picture for two (2) simultaneous video feeds from the transmitter 163 on the helicopter 100.

In one embodiment, the ground station unit 169 includes a portable DVR 179, one for each RCA channel (i.e., two DVRs), and an additional high gain antenna/patch panel 180 for additional gain.

In one embodiment, the ground station unit 169 is supported by a stand 181, such as an aluminum tripod with extendable legs, mounted on the back side of the ground station unit 169 at bracket 181.

In an exemplary embodiment, the ground station unit 169 utilizes both a remote control and/or wireless-connected computer (such as a computer laptop (not shown)) which operates a software program specific to the present invention. As stated above, the helicopter 100 of the present invention has a wireless communication data link 163 (for example, 900 MGHz-2.4 GHz) with the ability to transmit and receive flight instructions to and from the helicopter 100 and the ground station 169. The ground station 169 has the ability to send input commands to the helicopter 100 via, for example: a) the remote control wireless controller 169, or b) a computer (not shown) configured with flight software connected to the wireless data link 163. Thus, the ground station 169 allows the helicopter 100 to be managed fully from the ground station 169 software program via a wireless modem transmission/receiving signal.

With respect to the computer and software program, one of ordinary skill in the art would know that any state-of-the-art computer, particularly a laptop, may be used with the present invention. The present invention has the ability to specify via any computer code (i.e., XML, user interface, data files, Microsoft Windows® user interface or other computer elements), commands to control the helicopter 100. The computer may include standard processing and memory capability, including any of a central processing unit (CPU), parallel processor, RAM/ROM with a program, USB interface, telephone interface, microphones, speakers, a computer mouse, a wide area network interface, image display device, local area network interfaces, hard disk drives, DVD/CD readers/burners, a keyboard, wireless communication interfaces, and/or other components. The computer used with the present invention may include, or be modified to include, software that may operate to provide data gathering and data exchange functionality. The invention may be implemented by an application that resides on the computer, wherein the application may be written to run on existing computer operating systems. Users may interact with the application through a graphical user interface. The application may be ported to other personal computer (PC) software, personal digital assistants (PDAs), cell phones, and/or any other digital device that includes a graphical user interface and appropriate storage capability.

While the system of the present invention may be described as performing certain functions, one of ordinary skill in the art will readily understand that the program may perform the function rather than the entity of the system itself. The program that runs the application may include separate programs having code that performs desired operations. Thus, the program may include a plurality of modules that perform sub-operations of an operation, or may be part of a single module of a larger program that provides the operation.

The memory or storage device may store at least one data file, such as image files, text files, data files, audio files, video files, among other file types. The data storage device may include a database, such as a centralized database and/or a distributed database that are connected via a network.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the computer, a server, or both.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using software.

The underlying technology allows for replication to various other sites. Each new site may maintain communication with its neighbors so that in the event of a catastrophic failure, one or more servers may continue to keep the applications running, and allow the system to load-balance the application geographically as required.

Further, although aspects of one implementation of the invention are described as being stored in memory, one of ordinary skill in the art will appreciate that all or part of the invention may be stored on or read from other computer-readable media, such as secondary storage devices, like hard disks, floppy disks, CD-ROM, a carrier wave received from a network such as the Internet, or other forms of ROM or RAM either currently known or later developed. Further, although specific components of the system have been described, one skilled in the art will appreciate that the system suitable for use with the methods and systems of the present invention may contain additional or different components.

Method of Operation

In an exemplary embodiment, the autopilot 157 of the helicopter 100 of the present invention is operated in two separate modes: 1) via a wireless hand-held remote control unit 168 (without computer programming/software), and 2) via a ground station unit 169 (with computer programming/software). The primary pilot handles the ground station mode 169, with the safety pilot handling the hand held remote control mode 168, and in some cases, the primary and safety pilot are one and the same when only a hand-held remote control unit 168 is used. With either mode, the helicopter 100 can be placed into flight in a matter of minutes, providing flexibility and advantages of rapid deployment to the user.

a) Pre-Flight Checklist

In both modes of operation, the user follows a pre-flight checklist, with a specific pre-flight checklist for each mode of operation (i.e., hand-held 168, or ground station 169).

Generally, in one embodiment of the overall pre-flight checklist, the user checks the tail gyrometer 130 by swinging the tail boom 120 left and right. The user then turns on the helicopter 100, at on/off switch 183, and ensures the autopilot 157 is "ON" (LED 162 is lighted), and then performs a gimbal and video check. This gimbal and video check is performed by ensuring power is being provided to the video transmitter 167, the payload (for example, camera 156), the computer modem (if applicable), the camera 156 transmitter (if applicable), the gimbal/gear systems 153, 155 of the camera mount 150, the LCD panel 173 on the hand-held remote 168 or ground station 169, and the LCD transmitter 146. The user then checks the signal strength of the live video.

At this time, the user may connect the main power flight batteries 131 on the battery shelf 132 (if not already done), and then check that all is clear on the flight line (i.e., powering "ON" of rotors 104, 118). [000107] In one embodiment of the hand-held remote control unit 168 operation, the user checks the battery 131 voltage to ensure that the target minimum for flight is available. This would include the main batteries 131 and any auxiliary batteries B1, B2, etc. The user would also check all the mechanical connections, including the main rotor 104, the swash plate 111 connections, the primary gear 116, the tail rotor 118, and the landing gear L1. The video transmitter 167 would be checked to ensure remote control is selected, and all LEDs 148, 149 should be "ON", and the throttle trim setting should be checked. The batteries 131 should be double batteries 131 only for remote control operation, and the electrical panel 129 should have LED lights 162 "ON", with no red lights showing errors. The GPS 145 should show "ON" and the status on the LCD 146 should be "OK" for all systems. The user can then check the joy stick 176a, 176b operation on the hand-held remote control unit 168, with the throttle/rudder being operated by the left joy stick 176a, with throttle being forward/backward, a counterclockwise direction on the throttle being the rudder and left/right, and the right joy stick 176b used for elevator/aileron.

In another embodiment for the ground station 169 checklist, the user must run through checks on the computer in addition to the above pre-flight checklist of the helicopter 100 itself. In this case, the user would turn on the computer at the ground station 169, and bring up the software program that handles the helicopter 100 flight. The ground station 169 should be on A/C power (for example, more than 14 volts), or the user should ensure that the batteries 131, and auxiliary batteries B1, B2, etc., on the helicopter 100 are sufficient for flight.

Specifically, in one embodiment, the user should verify that the icons which denote the helicopter and ground station on the computer screen, are in the expected map area (i.e., that the GPS 145 telemetry is working properly). The GPS 145 count, the number of satellites, and the position dilution of position (PDOP) of the GPS 145 should be checked and verified, and radio settings requested. If waypoints are to be scheduled (discussed further below), the user should validate the sequence and the order of same. The user should check the mission limits, such as height maximum/minimum, flight battery time, flight termination conditions, and communications timeout (where lack of communications triggers a safety return (described later)), as well as the command settings (i.e., vehicle velocity, altitude, etc.— usually automatic). The helicopter 100 controls should be checked for pitch, rolling, collective (i.e., swash plate 111 movement), and yawing, as well as tilt forward, backward, lift up for artificial horizon, and for operation of the tail gyrometer 130 and inertial measurement units (IMUs) in the autopilot 157 (used by the safety pilot).

Once all the safety and flight operation testing and checklist is performed by the user, if all systems are ready and the helicopter 100 can be flown, the user may begin flight operations using either the hand-held remote control unit 168 or the ground station unit 169. Aircraft traffic should be checked and any radio calls mandated by air traffic control should be made. The operation of the flight mission can be timed by the user or the computer.

b) Hand Held Video Operation

In this exemplary mode, the wireless remote control unit 168 sends wireless signals to the matching RC receiver 164 as input to the helicopter 100 and autopilot 157. The user utilizes the two joy sticks 176a, 176b on the wireless remote control 168 as input to the onboard helicopter autopilot 157, and the autopilot 157 then interprets the input commands from the joy sticks 176a, 176b to create outputs from the autopilot 157 to the helicopter 100 for flight: up, down, tail left, tail right, forward, backward, left sideways, right sideways. The autopilot 157 issues the appropriate commands via an electrical output to the onboard helicopter control mechanisms (i.e., rotors 104, 118, motors 117, 119, swash-plate 111, and servomechanisms 114, etc.), that control the helicopter 100.

In one embodiment, in the hand-held remote control mode, the user may utilize the wireless control system 168 to send and receive camera 156 and gimbal functions, including, for example: i) three (3) degrees of motion for the camera 156, including pan and tilt, up and down, and spinning 360 degrees in a circle. As stated above, a second data channel may be used for the operation of the camera 156 including zoom, shutter, focus and other applicable camera 156 functions.

c) Ground Station Video Operation

In this exemplary mode, both a ground station unit 169, with a wireless connected computer running helicopter operational software, are used. The ground station unit 169 includes a second wireless communication data link 170 with the ability to transmit and receive flight instructions to and from the helicopter 100 to the ground station 169. The ground station unit 169 has the ability to send input commands to the helicopter 100 by: a) the remote control wireless controller 169, or b) a computer configured with flight software connected to the wireless data link 163. The ground station 169 mode allows the helicopter 100 to be managed fully from the software program run from the computer via a wireless modem transmission/receiving signal.

In this exemplary embodiment, and similarly to the hand-held remote control unit 168, the helicopter 100 is controlled, via the autopilot 157, but from the ground station unit 169, for flight, including: up, down, tail left, tail right, forward, backward, left sideways, right sideways. The ground station unit 169, thus, issues the appropriate commands via the wireless modem transmission/receiving signal, to the onboard helicopter control mechanisms (i.e., rotors 104, 118, motors 117, 119, swash-plate 111, and servomechanisms 114, etc., that control the helicopter 100.

Thus, as stated above, the user may utilize the ground station unit 169 to command the autopilot 157 to control payload functions, such as camera 156 functions. In one embodiment, the camera 156 and gimbal functions, including: i) three (3) degrees of motion for the camera 156, including pan and tilt, up and down, and spinning 360 degrees in a circle. As stated above, a second data channel may be used for the operation of the camera 156 including zoom, shutter, focus and other applicable camera 156 functions.

d) Features of Camera Payload

In one embodiment, whether using the hand-held remote control unit 168 or ground station unit 169, the present invention includes a feature for an automated command to be sent from the autopilot 157 to the payload, i.e., the remote control camera 156. The command would be an electronic trigger for the camera 156 to automatically take photographs in any direction. The user may command this automatic feature detailing when (time), where (GPS, altitude), and how (helicopter 100 vehicle attitudes), the photographs would be automatically taken by the camera 156. The user may use the data and the photographs captured, to create a mosaic, for example.

In an exemplary embodiment, the autopilot 157 of the present invention can also trigger automatic photographs to be taken in accordance with the following functions, for example: the number of waypoints or GPS specified points; the altitude of these waypoints; the specific latitude and longitude of the waypoints or GPS specified points; the forward velocity of the helicopter 100 between any of these points; and the percentage overlap of the photos to be taken. The total combination creates the ability to pick "n"-number of points for the autopilot 157 to follow.

In an exemplary embodiment, the autopilot 157 of the present invention has the ability to send an electronic command to the camera 156, and simultaneously to data log the commands of the latitude, longitude, altitude and exact X, Y and Z velocities. These elements will be entered into a data file from the real time data coming from the autopilot 157 and readable by any type of common computer software program (i.e., XML, and Comma Delimited file).

e) Onboard Helicopter Autopilot Features

In other embodiments, there are several features which the onboard helicopter autopilot 157 can operate with input from the ground via the two previously mentioned modes (i.e., hand-held 168, and ground station 169), and they include:

i) Automatic Takeoff

In one embodiment, the helicopter 100 of the present invention has the ability to "Auto takeoff" via the hand-held remote control unit 168 mode, or the wireless ground station unit with computer 169 mode. The computer software program includes a set of commands that instruct the helicopter 100 to lift from the ground into a stationary hovering position at a preset altitude (for example, typically set at 10 meters above the mean sea level of where the helicopter 100 started).

ii) Automatic Landing

In one embodiment, the helicopter 100 of the present invention has the ability to "Auto land" via the hand-held remote control unit 168 mode, or the wireless ground station unit with computer 169 mode. The computer software program includes a set of commands that will instruct the helicopter 100 to maintain a specified GPS 145 position, to descend at a predetermined velocity, and to land on the ground and turn off all rotors 104, 118 and motors 117, 119.

iii) Autonomous Flight Between Waypoints

As discussed above, in one embodiment, the helicopter 100 of the present invention has the ability to fly automatically without human input from predetermined or predefined GPS 145 waypoints, at a specified altitude, specified velocity, and specified GPS latitude and longitude. This instruction will make the helicopter 100 move from a hover position at one GPS position, including a specified altitude, and forward velocity to another GPS waypoint. Then once at the new GPS position, the instructions will include further required helicopter 100 behavior (i.e., hover, or continue to yet another GPS waypoint).

iv) Safety Return

In one embodiment, the helicopter 100 of the present invention has the ability to perform an automated return to "home" flight function that allows for the helicopter 100 to fly back to a "home" pre-determined GPS latitude and longitude via a pre-determined flight course, at a specified altitude, specified velocity and specified heading. Once this function is triggered by the user, or by a predefined set of conditions, the helicopter 100 will descend at a pre-determined velocity and once on the ground, turn off all rotors 104, 118 and motors 117, 119. The following conditions may create a "home" flight function, or safety return:

a) a pre-defined time frame of a lack of communication time between the helicopter 100 and the user at the hand-held remote control unit 168 or ground station unit 169, requiring a return to a predetermined "home" GPS latitude and longitude.

b) achieving a pre-determined remaining percentage of total power, which triggers a return to a predetermined "home" GPS latitude and longitude.

c) achieving a specified helicopter 100 health condition (programmed into the software using custom functions), the health conditions including, but not limited to, "real-time" elements, such as battery 131 power, telemetry connectivity, and other key attributes, along with motor temperature, humidity, wind and other conditions.

f) Predetermined Missions Software Program

In an exemplary embodiment, the ground station unit 169 computer software program allows for the creation of pre-determined missions including the capability to download satellite images of terrain with geo-referenced data and develop complete flight plans that include detailed GPS coordinates/way points (i.e., longitude, latitude, velocity, and payload commands) management, and the ability to create height, attitude and helicopter 100 direction, and speed of movement, between all way points. The user can utilize the software program and an input device (i.e., mouse) to the computer, to point and "click", for example, on the geo-referenced map to create, for example, waypoint programming, real time in-flight mission loading or mission changes, mission interrupt, "continue" command at way-point X, automatic takeoff, and automatic landing.

In one embodiment, the user has the flexibility to switch between the hand-held remote control unit 168 (with or without autopilot 157) and ground station unit 169 during a mission (using a "toggle" switch), or "home" mode (which allows the helicopter 100 to return to a predetermined GPS point and either hover, or land and turn off all rotors/motors). The ability to seamlessly switch into and back from the mission mode completes the ability of the helicopter 100 to have autonomous flight.

Thus, although the helicopter has been described in detail, it should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention. The scope of the invention is to be determined solely by the appended claims.

The invention claimed is:

1. A reduced scale helicopter comprising:
a chassis having two hinged side panels and a bottom panel;
a main rotor mounted on a rotor shaft disposed within said chassis;
a rotor head assembly mounted on said rotor shaft and including a plurality of main rotor blades;
a swash plate disposed on said rotor shaft, and connected to said rotor blades via a plurality of pushrods;
a plurality of control arms which connect said swash plate to said rotor shaft;
a plurality of connectors which connect said swash plate to an electrical panel which controls movements of the helicopter, said electrical panel being electrically connected to a plurality of indicators which show a user a flight status of the helicopter;
a tail rotor assembly comprising a removable, hollow tail boom removably secured to and extending rearward from said chassis, a tail rotor disposed on one end of the removable, hollow tail boom and mounted on a tail rotor shaft which is rotatably disposed within the removable, hollow tail boom, a tail motor for driving the tail rotor and which is mounted on the removable, hollow tail boom, a tail speed controller for the tail motor, and a tail gyrometer connected to the tail speed controller and having a quick release connection via quick release connector leads to a programming interface which is disposed on said chassis, the tail gyrometer being controlled using the programming interface;

a plurality of battery shelves disposed on each of said hinged side panels of said chassis;

a plurality of batteries disposed on each of said plurality of battery shelves;

a landing gear disposed under said bottom panel of said chassis; and an autopilot disposed within and mounted to said chassis by a plurality of boards secured by vibration mounts, said autopilot being electrically connected to said electrical panel;

wherein said autopilot receives wireless instructions, for helicopter control.

2. The helicopter according to claim 1, further comprising:

a gear disposed on said rotor shaft and connected to a plurality of gears in a main motor, to spin said rotor shaft and said main rotor.

3. The helicopter according to claim 1, further comprising:

an auxiliary battery disposed at a tail portion proximate to said tail boom.

4. The helicopter according to claim 1, further comprising:

a plurality of connectors which connect said batteries to said electrical panel.

5. The helicopter according to claim 2, further comprising:

a main motor speed controller connected to said batteries, which conditions a power from said batteries and acts as an adjustable speed regulator for said main motor.

6. The helicopter according to claim 1, further comprising:

a magnetometer disposed on a supporting holder on said tail boom; and a global positioning system (GPS) connected to said magnetometer;

wherein said GPS provides real-time positional information to said autopilot.

7. A reduced scale helicopter comprising:

a chassis;

a main rotor mounted on a rotor shaft disposed within said chassis;

a rotor head assembly mounted on said rotor shaft and including a plurality of main rotor blades;

a power source disposed on said chassis;

a landing gear disposed under said chassis; and an autopilot disposed within and mounted to said chassis said autopilot being electrically connected to an electrical panel, and said autopilot receiving wireless instructions for helicopter control; and a liquid crystal display (LCD) screen mounted in said chassis, and connected to said electrical panel and said autopilot, to display a status of the reduced scale helicopter to a user located externally of the reduced scale helicopter, wherein said LCD screen displays two or more of a plurality of error codes including a status of said autopilot, a status of satellite reception and grade of satellite reception from a global positioning system (GPS), a percentage of power used by said power source and remaining power available, an overall health of helicopter operating systems, revolutions per minute (RPM) of the main rotor, or a stability status of the reduced scale helicopter; and a plurality of light-emitting diodes (LEDs) disposed next to said LCD screen and being electrically connected to said electrical panel, wherein at least one LED indicates to a user located externally of the reduced scale helicopter that an error has occurred, and wherein at least one other LED indicates to a user located externally of the reduced scale helicopter that all systems are operating properly and that the reduced scale helicopter is safe to fly.

8. The helicopter according to claim 7, further comprising:

a flight data card removably mounted in said chassis and connected to said electrical panel, said LCD screen, and said autopilot, which records data collected from each flight of the helicopter.

9. The helicopter according to claim 1, further comprising a payload connected to said chassis, wherein said payload is mounted at one of a front of the helicopter forward of said chassis, under said bottom panel of said chassis, or mounted hanging below the helicopter.

10. The helicopter according to claim 9, wherein said payload is mounted to the front of the helicopter and is a camera assembly.

11. The helicopter according to claim 10, wherein said camera assembly comprises:

two horizontal elements extended forward from and connected to the two hinged side panels, respectively, of the chassis;

a plate connecting the two horizontal elements for stabilization;

two vertical parallel plates extending downward from said two horizontal elements, and connected together by said plate; and a camera, gimbal-mounted to said plate.

12. The helicopter according to claim 11, further comprising:

a wireless video transmitter, connected to said camera, which sends video and still photographs to one of a wireless transmitter/receiver at a ground station unit, or a wireless transmitter/receiver hand-held remote control unit.

13. The helicopter according to claim 11, wherein said camera is controlled by a wireless transmitter/receiver hand-held remote control unit.

14. The helicopter according to claim 1, wherein said plurality of boards comprises two horizontal boards located at a top and a bottom of a vertical board to which said electrical panel is mounted, said two horizontal boards being connected to said chassis by attachment mechanisms, said two horizontal boards and vibrations mounts which provide shock and vibration isolation in three axes, to said electrical panel.

15. The helicopter according to claim 6, wherein said autopilot is connected to said GPS, and receives satellite information that said autopilot uses to identify locations in latitude, longitude, altitude and velocity.

16. The helicopter according to claim 7, wherein said power source comprises a battery unit disposed under a bottom portion of said chassis and connected thereto.

17. The helicopter according to claim 16, further comprising:
a battery rail system disposed on a top of said battery unit;
a chassis rail system disposed under said bottom portion of said chassis, which corresponds to said battery rail system and slidingly engages therewith; and
a handle disposed at one end of said battery unit, which allows the user to slide said battery unit into a locking position and to pull and release said battery unit from said helicopter.

18. A reduced scale helicopter comprising:
a chassis;
a main rotor mounted on a rotor shaft disposed within said chassis;
a rotor head assembly mounted on said rotor shaft and including a plurality of main rotor blades;
a landing gear disposed under said bottom panel of said chassis;
an autopilot disposed within and mounted to said chassis, said autopilot being electrically connected to an electrical panel;
a slide lock battery unit disposed under a bottom portion of said chassis; and
a connecting mechanism for connecting said slide lock battery unit to said bottom portion of said chassis, wherein said connecting mechanism comprises:
a battery rail system disposed on a top of said slide lock battery unit;
a chassis rail system disposed under said bottom portion of said chassis and having terminals, which corresponds to said battery rail system and slidingly engages therewith; and
a handle disposed at one end of said slide lock battery unit, which allows the user to slide said slide lock battery unit into a locking position and to pull and release said slide lock battery unit from said helicopter, such that during mounting the slide lock battery unit is placed into the chassis rail system, and slid into place along the chassis rail system, until the slide lock battery unit connects with the terminals of the chassis rail system.

19. The helicopter according to claim 1, further comprising:
a payload connected to said chassis;
wherein said autopilot receives wireless instructions, for helicopter control, from at least one of a first wireless communication transmitter/receiver disposed on the helicopter, said first wireless communication transmitter/receiver that transmits and receives wireless instructions from a ground station unit, or a second wireless transmitter/receiver disposed on the helicopter, that transmits and receives wireless instructions from a hand-held remote control unit; and
wherein said hand-held remote control unit includes:
a plurality of antennae for receipt of a video transmission from said payload from said second wireless communication transmitter/receiver;
a wireless video receiver/transmitter disposed in a housing for receiving said video transmission from said payload from said second wireless communication transmitter/receiver;
an LCD screen which displays said video transmission;
a remote control assembly, including a plurality of joy sticks, for control of the helicopter and said payload; and
a battery assembly which powers said hand-held remote control unit.

20. The helicopter assembly according to claim 19, wherein said ground station unit comprises:
a plurality of antennae for receipt of a video transmission from said payload from said first wireless communication transmitter/receiver;
a wireless video receiver/transmitter disposed in a housing for receiving said video transmission from said payload from said first wireless communication transmitter/receiver;
an LCD screen which displays said video transmission;
a battery assembly which powers said ground station unit;
a portable DVR;
an antenna/patch panel; and
a computer having a processor and memory, which runs a software program specific to helicopter control.

21. The helicopter assembly according to claim 19, wherein said payload is a camera, and said video transmission includes photographs.

22. The helicopter assembly according to claim 19, further comprising:
a second wireless communication data link which transmits and receives flight instructions to and from the helicopter for operation of said payload.

23. The helicopter according to claim 1, wherein said chassis is made of carbon fiber.

24. The helicopter according to claim 18, wherein said chassis is made of carbon fiber.

25. The helicopter according to claim 7, wherein said chassis is made of carbon fiber.

26. The helicopter according to claim 17, further comprising:
a keyed locking mechanism disposed on said battery unit for locking said battery unit to said chassis.

27. The helicopter according to claim 18, further comprising:
a keyed locking mechanism disposed on said slide lock battery unit for locking said slide lock battery unit to said chassis.

28. The helicopter assembly according to claim 20, wherein said payload is a camera, and said video transmission includes photographs.

29. The helicopter assembly according to claim 20, further comprising:
a second wireless communication data link which transmits and receives flight instructions to and from the helicopter for operation of said payload.

30. The helicopter according to claim 1, further comprising:
a battery recharge unit disposed under said chassis of the helicopter.

31. The helicopter according to claim 1, wherein said vibration mounts comprise interchangeable vibration mounts, said interchangeable vibration mounts including mounts having different shock absorption rates to allow for low-high vibrations.

* * * * *